United States Patent
Jung et al.

(10) Patent No.: US 9,221,954 B2
(45) Date of Patent: Dec. 29, 2015

(54) POLYIMIDE FILM

(75) Inventors: Hak Gee Jung, Yongin-si (KR); Hyo Jun Park, Yongin-si (KR); Sang Min Song, Yongin-si (KR); Chung Seock Kang, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 812 days.

(21) Appl. No.: 12/674,310

(22) PCT Filed: Aug. 19, 2008

(86) PCT No.: PCT/KR2008/004792
§ 371 (c)(1),
(2), (4) Date: May 4, 2010

(87) PCT Pub. No.: WO2009/025479
PCT Pub. Date: Feb. 26, 2009

(65) Prior Publication Data
US 2011/0311796 A1    Dec. 22, 2011

(30) Foreign Application Priority Data

Aug. 20, 2007 (KR) .................. 10-2007-0083626
Sep. 12, 2007 (KR) .................. 10-2007-0092702

(51) Int. Cl.
*B32B 27/32* (2006.01)
*C08J 5/18* (2006.01)
*G02B 1/10* (2015.01)
*G02B 1/111* (2015.01)
*G02F 1/1335* (2006.01)

(52) U.S. Cl.
CPC . *C08J 5/18* (2013.01); *G02B 1/105* (2013.01); *G02B 1/111* (2013.01); *C08J 2379/08* (2013.01); *G02F 1/133502* (2013.01); *G02F 2201/50* (2013.01); *G02F 2202/022* (2013.01)

(58) Field of Classification Search
None
See application file for complete search history.

(56) References Cited

U.S. PATENT DOCUMENTS

| 4,874,834 | A * | 10/1989 | Higashi et al. | 528/176 |
| 4,876,330 | A * | 10/1989 | Higashi et al. | 528/353 |
| 6,232,428 | B1 * | 5/2001 | Deets et al. | 528/170 |
| 7,229,686 | B2 * | 6/2007 | Yoshikawa et al. | 428/343 |

FOREIGN PATENT DOCUMENTS

EP    1749850 A1 *  2/2007

OTHER PUBLICATIONS

Matsuura et al. "Polyimide Derived from 2-2'-Bis(trifluoromethyl)-4-4'-diaminobiphenyl. 1. Synthesis and Characterization of Polyimides Prepared with 2,2-Bis(3,4-dicarboxyphenyl)hexafluoropropane Dianhydride or Pyromellitic Dianhydride". Macromolecules, 24, (1991); pp. 5001-5005.*
Matsuura et al. "Polyimides Derived from 2,2'-Bis(trifluoromethyl)-4-4'-diaminobiphenyl. 4. Optical Properties of of Fluorinated Polyimides for Optoelectronic Components". Macromolecules, 27, (1994); pp. 6665-6670.*

* cited by examiner

*Primary Examiner* — Prashant J Khatri
(74) *Attorney, Agent, or Firm* — Sughrue Mion, PLLC

(57) ABSTRACT

Disclosed is a polyimide film, which is colorless and transparent, and which prevents the distortion of an image and exhibits excellent color reproducibility.

10 Claims, No Drawings

POLYIMIDE FILM

CROSS REFERENCE TO RELATED APPLICATIONS

This application is a National Stage of International Application No. PCT/KR2008/004792 filed Aug. 19, 2008, claiming priority based on Korean Patent Application Nos. 10-2007-0083626 filed Aug. 20, 2007 and 10-2007-0092702 filed Sep. 12, 2007, the contents of all of which are incorporated herein by reference in their entirety.

TECHNICAL FIELD

The present invention relates to a polyimide film which is colorless and transparent.

BACKGROUND ART

Generally, a polyimide (PI) film is a film of polyimide resin. Polyimide resin is a highly heat-resistant resin obtained by subjecting aromatic dianhydride and aromatic diamine or aromatic diisocyanate to solution polymerization to prepare a polyamic acid derivative, which is then subjected to ring closure and dehydration at high temperatures to imidize it. For the preparation of the polyimide resin, examples of the aromatic dianhydride include pyromellitic dianhydride (PMDA) and biphenyltetracarboxylic dianhydride (BPDA), and examples of the aromatic diamine include oxydianiline (ODA), p-phenylene diamine (p-PDA), m-phenylene diamine (m-PDA), methylene dianiline (MDA), and bisaminophenyl hexafluoropropane (HFDA).

Polyimide resin, which is insoluble, infusible and resistant to very high heat, has superior properties regarding such as thermal oxidation resistance, heat resistance, radiation resistance, low-temperature resistance, and chemical resistance, and is thus used in various fields of application, including advanced heat resistant materials such as automobile materials, aircraft materials, or spacecraft materials, and electronic materials such as insulation coating agents, insulating films, semiconductors, or electrode protective films of TFT-LCDs. Recently, polyimide resin is also used for display materials, such as optical fibers or liquid crystal alignment layers, and transparent electrode films, in which conductive filler is contained in the film or is applied onto the surface of the film.

However, polyimide resin is disadvantageous because it has a high aromatic ring density, and thus is colored brown or yellow, undesirably resulting in low transmittance in the visible light range. Further, polyimide resin suffers because light transmittance is decreased attributable to the yellow-like color thereof, thus making it difficult to apply the polyimide resin to fields requiring transparency.

In order to solve such problems, attempts to realize methods of purifying monomers and a solvent to high purities in order to achieve polymerization have been made, but the improvement in transmittance was not large.

U.S. Pat. No. 5,053,480 discloses a method of preparing a polyimide resin using an alicyclic dianhydride component instead of the aromatic dianhydride. According to this method, when the polyimide resin is in a solution phase or a film phase, transparency and color are improved, compared to the results of the purifying methods. However, limitations are imposed on improving transmittance, and thereby high transmittance is not realized and further, the thermal and mechanical properties are deteriorated.

In U.S. Pat. Nos. 4,595,548, 4,603,061, 4,645,824, 4,895,972, 5,218,083, 5,093,453, 5,218,077, 5,367,046, 5,338,826, 5,986,036, and 6,232,428, and Korean Unexamined Patent Publication No. 2003-0009437, there have been reports related to the preparation of a novel polyimide, which is improved in terms of transmittance and color transparency within a range inside which thermal properties are not greatly decreased, using aromatic dianhydride and aromatic diamine monomers, having a linker, such as —O—, —$SO_2$—, or $CH_2$—, a bent structure due to connection not at the p-position but at the m-position, or a substituent, such as —$CF_3$. However, the polyimide thus prepared is evaluated to have mechanical properties, yellowing index, and visible light transmittance which are inadequate for use in semiconductor insulating films, TFT-LCD insulating films, electrode protective films, and flexible display substrates.

DISCLOSURE

Technical Problem

Accordingly, the present invention provides a polyimide film, which is colorless and transparent and has a low refractive index and a low birefringence.

In addition, the present invention provides a polyimide film which is colorless and transparent and has superior mechanical properties and high thermal stability.

Technical Solution

According to a preferred embodiment of the present invention, a polyimide film may have a refractive index of 1.60 or less and a birefringence of 0.10 or less when measured using a prism coupler, and average transmittance of 85% or more at 380~780 nm when measured using a UV spectrophotometer for a film thickness of 25~100 µm.

The polyimide film according to the embodiment of the present invention may have transmittance of 88% or more at 550 nm and transmittance of 70% or more at 440 nm, when measured using a UV spectrophotometer for the film thickness of 25~100 µm.

The polyimide film according to the embodiment of the present invention may have a yellowness index of 15.0 or less for the film thickness of 25~100 µm.

The polyimide film according to the embodiment of the present invention may have a yellowness index of 5.0 or less and a whiteness index of 60 or more for the film thickness of 25~100 µm.

The polyimide film according to the embodiment of the present invention may have a 50% cut-off wavelength of 400 nm or less when measured using a UV spectrophotometer.

The polyimide film according to the embodiment of the present invention may have color coordinates in which L is or more, a is 5 or less and b is 5 or less, when measured using a UV spectrophotometer for the film thickness of 25~100 µm.

The polyimide film according to the embodiment of the present invention may be obtained by polymerizing a diamine and a dianhydride in the presence of a first solvent, thus obtaining a polyamic acid solution, imidizing the polyamic acid solution, adding the imidized solution to a second solvent, performing filtration and drying, thus obtaining a solid polyimide resin, dissolving the solid polyimide resin in the first solvent, thus preparing a polyimide solution, which is then subjected to a film forming process.

In the embodiment of the present invention, the second solvent may have polarity lower than that of the first solvent.

In the embodiment of the present invention, the first solvent may comprise one or more selected from among m-cresol, N-methyl-2-pyrrolidone (NMP), dimethylformamide (DMF), dimethylacetamide (DMAc), dimethylsulfoxide (DMSO), acetone, diethylacetate, a low boiling point solvent, and a low absorbing solvent, and the second solvent may comprise one or more selected from among water, alcohols, ethers, and ketones.

The polyimide film according to the embodiment of the present invention may be manufactured using an aromatic dianhydride which comprises one or more selected from among 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic anhydride (TDA), 4,4'-(4,4'-isopropylidenediphenoxy)bis(phthalic anhydride) (HBDA), 3,3'-(4,4'-oxydiphthalic dianhydride) (ODPA), and 3,4,3,4'-biphenyltetracarboxylic dianhydride (BPDA).

The polyimide film according to the embodiment of the present invention may be manufactured using an aromatic diamine which comprises one or more selected from among 2,2-bis[4-(4-aminophenoxy)-phenyl]propane (6HMDA), 2,2'-bis(trifluoromethyl)-4,4'-diaminobiphenyl(2,2'-TFDB), 3,3'-bis(trifluoromethyl)-4,4'-diaminobiphenyl(3,3'-TFDB), 4,4'-bis(3-aminophenoxy)diphenylsulfone (DBSDA), bis(3-aminophenyl)sulfone (3DDS), bis(4-aminophenyl)sulfone (4DDS), 1,3-bis(3-aminophenoxy)benzene (APB-133), 1,4-bis(4-aminophenoxy)benzene (APB-134), 2,2'-bis[3(3-aminophenoxy)phenyl]hexafluoropropane (3-BDAF), 2,2'-bis[4(4-aminophenoxy)phenyl]hexafluoropropane (4-BDAF), and oxydianiline (ODA).

In addition, according to another preferred embodiment of the present invention, an anti-reflective film may comprise the above polyimide film.

In addition, according to a further preferred embodiment of the present invention, a substrate for a display may comprise the above polyimide film.

In addition, according to still a further preferred embodiment of the present invention, a protective film may comprise the above polyimide film.

Advantageous Effects

According to the present invention, the polyimide film is colorless and transparent and has a low refractive index and a low birefringence, and can thus be used for LCDs. In addition, the polyimide film is colorless and transparent and exhibits superior mechanical properties and high thermal stability and is thus suitable for use in various fields including semiconductor insulating films, TFT-LCD insulating films, passivation films, liquid crystal alignment layers, optical communication materials, protective films for solar cells, anti-reflective films, and flexible display substrates.

BEST MODE

Hereinafter, a detailed description will be given of the present invention.

A polyimide film according to the present invention is a film of polyimide resin prepared from a copolymer of a diamine component and a dianhydride component, and in particular, is a colorless transparent polyimide film.

Typically, a film for use in a TFT substrate, a color filter substrate, and an alignment layer, which are applied on the backlight unit of an LCD, must have a low refractive index and a low birefringence. That is, because an image is displayed using light which is emitted from the backlight unit and transmitted through the LCD, as the transparency of a film which is located in the path of light is higher, a brighter image (brightness efficiency) and a clearer image may result.

Thus, when the refractive index and birefringence are lower, an original image may be reproduced as it is without the distortion of the image, including the effects of image overlap or variation in the size and color of the real image.

Specifically, first, when a film is colorless and transparent and has a low refractive index, the contrast ratio of the image on the screen is increased, and thus the ratio of the brightest white to the darkest black of the image is increased, thereby enhancing the definition of the image.

Second, when a film is colorless and transparent, it plays a role in enabling almost all of the light that enters the film to be transmitted while minimizing the absorption of light, thereby enhancing color reproducibility.

Third, when a film has a low refractive index, scattering of light for external light and an internal light source is reduced, thus enhancing the definition of the image on the screen. Conventionally, attempts to reduce the scattering of light have been made using various optical films or through coating treatment, but are disadvantageous because diffused reflection is caused, and thus the definition of the image is rather lowered. This problem may thus be overcome by the use of a film having a low refractive index.

Fourth, when a film has a low refractive index, the amount of light to be reflected is smaller than when using a conventional film, thus enhancing the definition of the image on the screen. That is, as the reflective index is higher, the amount of light passing through a medium is increased and thus light that comes out of the film is less intense than light that enters the film, undesirably lowering the definition of the image on the screen.

Fifth, when a film has a low refractive index and a low birefringence, the distortion of an image, including the image overlap or the variation in the size of the image, is reduced.

Hence, a film for application to LCDs preferably has a birefringence as close to zero as possible and a refractive index as low and as close as possible to the refractive index (1.54) of glass. From the point of these views, the polyimide film according to the present invention has a refractive index of 1.60 or less and a birefringence of 0.10 or less when measured using a prism coupler. The polyimide film of the present invention satisfying the above refractive index and birefringence is adequate for use in LCDs.

Further, the polyimide film of the present invention has average transmittance of 85% or more at 380~780 nm when measured using a UV spectrophotometer for the film thickness of 25~100 μm. Also, the polyimide film has transmittance of 88% or more at 550 nm and 70% or more at 440 nm, when measured using a UV spectrophotometer for the film thickness of 25~100 μm.

Furthermore, the polyimide film of the present invention has a yellowness index of 15 or less. Also, the polyimide film has a yellowness index of 5.0 or less and a whiteness index of 60 or more for the film thickness of 25~100 μm. Also, the polyimide film has color coordinates, in which L is 90 or more, a is 5 or less and b is 5 or less, when measured using a UV spectrophotometer for the film thickness of 25~100 μm.

The polyimide film, satisfying the aforementioned transmittance, yellowness index and color coordinates, is able to be used in fields requiring transparency, in which the use of conventional polyimide films is limited attributable to the yellow color thereof, including therein protective films, or diffusion sheets and coating films of TFT-LCDs, for example, interlayers, gate insulators, and liquid crystal alignment layers of TFT-LCDs. When said transparent polyimide is applied to a liquid crystal alignment layer, it contributes to an increase in porosity, thus enabling the fabrication of a TFT-LCD having a high contrast ratio. As well, polyimide is able to be utilized for flexible display substrates.

The polyimide film of the present invention has a 50% cut-off wavelength of 400 nm or less, when measured using a UV spectrophotometer. The polyimide film satisfying the above condition is therefore able to be employed in a protective film for protecting the surface of a solar cell.

As for the polyimide film according to the present invention, the aromatic dianhydride component is not particularly limited but includes one or more selected from among 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic anhydride (TDA), 4,4'-(4,4'-isopropylidenediphenoxy)bis(phthalic anhydride) (HBDA), 3,3'-(4,4'-oxydiphthalic dianhydride) (ODPA), and 3,4,3',4'-biphenyltetracarboxylic dianhydride (BPDA).

Also, the aromatic diamine component is not particularly limited but includes one or more selected from among 2,2-bis[4-(4-aminophenoxy)-phenyl]propane (6HMDA), 2,2'-bis(trifluoromethyl)-4,4'-diaminobiphenyl(2,2'-TFDB), 3,3'-bis(trifluoromethyl)-4,4'-diaminobiphenyl(3,3'-TFDB), 4,4'-bis(3-aminophenoxy)diphenylsulfone (DBSDA), bis(3-aminophenyl)sulfone (3DDS), bis(4-aminophenyl)sulfone (4DDS), 1,3-bis(3-aminophenoxy)benzene (APB-133), 1,4-bis(4-aminophenoxy)benzene (APB-134), 2,2'-bis[3(3-aminophenoxy)phenyl]hexafluoropropane (3-BDAF), 2,2'-bis[4(4-aminophenoxy)phenyl]hexafluoropropane (4-BDAF), and oxydianiline (ODA).

The dianhydride component and the diamine component are dissolved in equivalent molar amounts in an organic solvent and are then allowed to react, thus preparing a polyamic acid solution.

The reaction conditions are not particularly limited, but include a reaction temperature of −20~80° C. and a reaction time of 2~48 hours. The reaction is preferably conducted in an inert atmosphere of argon or nitrogen.

A first solvent used for the solution polymerization of the aforementioned monomers includes any solvent without limitation as long as polyamic acid may be dissolved therein. As known reaction solvents, useful are one or more polar solvents selected from among m-cresol, N-methyl-2-pyrrolidone (NMP), dimethylformamide (DMF), dimethylacetamide (DMAc), dimethylsulfoxide (DMSO), acetone, and diethylacetate. Further, a low boiling point solvent, such as tetrahydrofuran (THF) or chloroform, or a low absorbing solvent, such as γ-butyrolactone, may be used.

The amount of the first solvent is not particularly limited, but is preferably set to 50~95 wt %, and more preferably 70~90 wt %, based on the total amount of the polyamic acid solution, in order to realize appropriate molecular weight and viscosity of the polyamic acid solution.

Further, when the polyimide film is manufactured using the polyamic acid solution, a filler may be added to the polyamic acid solution so as to improve various properties of the polyimide film, including sliding properties, heat conductivity, electrical conductivity, and corona resistance. The filler is not particularly limited, but specific examples thereof include silica, titanium oxide, layered silica, carbon nanotubes, alumina, silicon nitride, boron nitride, calcium hydrogen phosphate, calcium phosphate, and mica. The particle size of the filler may vary depending on the properties of the film to be modified and the type of filler to be added, and is not particularly limited. The average particle size thereof is preferably set within 0.001~50 μm, more preferably 0.005~25 μm, and still more preferably 0.01~10 μm. Such sizes facilitate the effective modification of the polyimide film and may result in good surface properties, electrical conductivity, and mechanical properties of the polyimide film.

The amount of the filler may vary depending on the properties of the film to be modified and the particle size of the filler, and is not particularly limited. The filler is added in an amount of 0.001~20 parts by weight, and preferably 0.01~10 parts by weight, based on 100 parts by weight of the polyamic acid solution.

The method of adding the filler is not particularly limited, but includes, for instance, adding the filler to the polyamic acid solution before or after polymerization, kneading the filler using a 3 roll mill after completion of the polymerization of polyamic acid, or mixing a dispersion solution containing the filler with the polyamic acid solution.

The method of manufacturing the polyimide film from the polyamic acid solution thus obtained includes any known method including casting of a polyamic acid solution on a support and then performing imidization.

As such, examples of the imidization therefor include thermal imidization, chemical imidization, and a combination of thermal imidization and chemical imidization. Chemical imidization is performed by adding a dehydrating agent including acid anhydride such as acetic anhydride and an imidization catalyst including a tertiary amine such as isoquinoline, β-picoline, or pyridine, to the polyamic acid solution. In the case where thermal imidization or a combination of thermal imidization and chemical imidization is applied, heating conditions of the polyamic acid solution may vary depending on the type of polyamic acid solution and the thickness of the resulting polyimide film.

When specifically describing the manufacture of the polyimide film using a combination of thermal imidization and chemical imidization, the polyimide film may be obtained by adding a dehydrating agent and an imidization catalyst to a polyamic acid solution, casting the polyamic acid solution on a support, performing heating at 80~200° C. and preferably 100~180° C. to activate the dehydrating agent and the imidization catalyst, performing partial curing and drying to obtain a polyamic acid film in a gel state, separating the gel film from the support, and heating the gel film at 200~400° C. for 5~400 sec.

Alternatively, in the present invention, a polyimide film may be manufactured through the following procedures using the polyamic acid solution. Specifically, the polyimide film may be obtained by imidizing the polyamic acid solution, adding the imidized solution to a second solvent, performing filtration and drying, thus obtaining a solid polyimide resin, dissolving the solid polyimide resin in the first solvent, thus preparing a polyimide solution, which is then subjected to a film forming process.

When the polyamic acid solution is imidized, thermal imidization, chemical imidization, and a combination of thermal imidization and chemical imidization may be applied as mentioned above. In the case of using a combination of thermal imidization and chemical imidization, imidization may be specifically executed by subjecting the polyamic acid solution to addition of a dehydrating agent and an imidization catalyst and then to heating at 20~180° C. for 1~12 hours.

The first solvent may be the same as the solvent used for the polymerization of the polyamic acid solution. In order to obtain the solid polyimide resin, the second solvent includes any solvent having polarity lower than that of the first solvent, with the consideration of the principle that the polyamic acid polymer is precipitated into a solid due to the difference in solubility using a solvent that is unable to dissolve the polyamic acid polymer. A specific example of the second solvent includes one or more selected from among water, alcohols, ethers, and ketones.

The amount of the second solvent is not particularly limited, and is preferably 5~20 times the weight of the polyamic acid solution.

The conditions for drying the filtered solid polyimide resin include a temperature of 50~150° C. and a time period of 2~24 hours, taking into consideration the boiling point of the second solvent and the boiling point of the first solvent which may remain in the solid resin.

In the film forming process, the polyimide solution, in which the solid polyimide resin is dissolved, is cast on the support, and is then heated for a period of time ranging from 1 min to 8 hours while the temperature is gradually increased at an incremental rate of 1~10° C./min within the range from 40° C. to 400° C., yielding the polyimide film.

The thickness of the polyimide film thus obtained is not particularly limited, but is preferably 10~250 μm, and more preferably 25~150 μm.

A better understanding of the present invention may be obtained through the following examples, which are set forth to illustrate, but are not to be construed as the limit of the present invention.

Example 1

While nitrogen was passed through a 100 ml three-neck round bottom flask reactor equipped with a stirrer, a nitrogen inlet, a dropping funnel, a temperature controller and a condenser, 34.1904 g of N,N-dimethylacetamide (DMAc) was placed in the reactor, the temperature of the reactor was decreased to 0° C., 4.1051 g (0.01 mol) of 6HMDA was dissolved therein, and then this solution was maintained at 0° C. Further, 4.4425 g (0.01 mol) of 6FDA was added thereto and stirred for 1 hour, thus completely dissolving the 6FDA. The solid content was thus 20 wt %. The solution was then stirred at room temperature for 8 hours, thus obtaining a polyamic acid solution having a viscosity of 2400 cps at 23° C.

Thereafter, the polyamic acid solution thus obtained was added with, as a chemical curing agent, 2~4 equivalents of each of acetic anhydride (acetic oxide, available from SamChun) and pyridine (available from SamChun), and was then heated at a heating rate of 1~10° C./min within a temperature range from 20° C. to 180° C. for 2~10 hours, thereby imidizing the polyamic acid solution. 30 g of the imidized solution was added to 300 g of water, after which the precipitated solid was filtered and milled, thus obtaining powder, which was then dried in a vacuum oven at 80~100° C. for 2~6 hours, giving about 8 g of solid resin powder. The solid resin thus obtained was dissolved in 32 g of DMAc or DMF acting as a polymerization solvent, thus obtaining a 20 wt % polyimide solution. The polyimide solution was heated at a heating rate of 1~10° C./min within a temperature range from 40° C. to 400° C. for 2~8 hours, resulting in polyimide films having a thickness of 50 μm and 100 μm.

Example 2

35.07 g of DMAc was placed in the same reactor as in Example 1, the temperature of the reactor was decreased to 0° C., 4.325 g (0.01 mol) of DBSDA was dissolved therein, and then this solution was maintained at 0° C. 4.4425 g (0.01 mol) of 6FDA was added thereto and then stirred for 1 hour, thus completely dissolving the 6FDA. The solid content was thus 20 wt %. The solution was then stirred at room temperature for 8 hours, thus obtaining a polyamic acid solution having a viscosity of 2100 cps at 23° C.

Thereafter, the same subsequent procedures as in Example 1 were conducted, thereby manufacturing polyimide films.

Example 3

30.5792 g of DMAc was placed in the same reactor as in Example 1, the temperature of the reactor was decreased to 0° C., 3.2023 g (0.01 mol) of 2,2'-TFDB was dissolved therein, and then this solution was maintained at 0° C. 4.4425 g (0.01 mol) of 6FDA was added thereto and then stirred for 1 hour, thus completely dissolving the 6FDA. The solid content was thus 20 wt %. The solution was then stirred at room temperature for 8 hours, thus obtaining a polyamic acid solution having a viscosity of 2400 cps at 23° C.

Thereafter, the same subsequent procedures as in Example 1 were conducted, thereby manufacturing polyimide films.

Example 4

As in Example 1, 2.24161 g (0.007 mol) of 2,2'-TFDB was dissolved in 29.716 g of DMAc, after which 0.7449 g (0.003 mol) of ODDS was added thereto and completely dissolved. Further, 4.4425 g (0.01 mol) of 6FDA was added thereto and then stirred for 1 hour, thus completely dissolving the 6FDA. The solid content was thus 20 wt %. The solution was then stirred at room temperature for 8 hours, thus obtaining a polyamic acid solution having a viscosity of 2000 cps at 23° C.

Thereafter, the same subsequent procedures as in Example 1 were conducted, thereby manufacturing polyimide films.

Example 5

As in Example 1, 3.2023 g (0.01 mol) of 2,2'-TFDB was dissolved in 33.6292 g of DMAc, and this solution was maintained at 0° C. 5.205 g (0.01 mol) of 6HBDA was added thereto and then stirred for 1 hour, thus completely dissolving the 6HBDA. The solid content was thus 20 wt %. The solution was then stirred at room temperature for 8 hours, thus obtaining a polyamic acid solution having a viscosity of 2100 cps at 23° C.

Thereafter, the same subsequent procedures as in Example 1 were conducted, thereby manufacturing polyimide films.

Example 6

As in Example 1, 3.2023 g (0.01 mol) of 2,2'-TFDB was dissolved in 31.82 g of DMAc, and this solution was maintained at 0° C. 4.164 g (0.008 mol) of 6HBDA and 0.58844 g (0.002 mol) of BPDA were sequentially added thereto and then stirred for 1 hour, thus completely dissolving the 6HBDA and BPDA. The solid content was thus 20 wt %. The solution was then stirred at room temperature for 8 hours, thus obtaining a polyamic acid solution having a viscosity of 1900 cps at 23° C.

Thereafter, the same subsequent procedures as in Example 1 were conducted, thereby manufacturing polyimide films.

Example 7

As in Example 1, 3.2023 g (0.01 mol) of 2,2'-TFDB was dissolved in 33.59 g of DMAc, and this solution was maintained at 0° C. 3.64355 g (0.007 mol) of 6HBDA and 1.551 g (0.003 mol) of ODPA were sequentially added thereto and then stirred for 1 hour, thus completely dissolving the 6HBDA and ODPA. The solid content was thus 20 wt %. The solution was then stirred at room temperature for 8 hours, thus obtaining a polyamic acid solution having a viscosity of 1800 cps at 23° C.

Thereafter, the same subsequent procedures as in Example 1 were conducted, thereby manufacturing polyimide films.

Examples 8~14

A polyamic acid solution having the same composition as in each of Examples 1~7 was prepared, after which the polyamic acid solution thus obtained was spread to a thickness of 500~1000 μm on a glass substrate using a doctor blade, and was then dried in a vacuum oven at 40° C. for 1 hour and at 60° C. for 2 hours, thus obtaining a self-supporting film, which was then heated in a high-temperature oven at 80° C. for 3 hours, 100° C. for 1 hour, 200° C. for 1 hour, and 300° C. for 30 min at a heating rate of 5° C./min, thereby affording polyimide films having a thickness of 50 μm and 100 μm.

Example 15

As in Example 1, 5.1846 g (0.01 mol) of 4-BDAF was dissolved in 38.5084 g of DMAc, and 4.4425 g (0.01 mol) of 6FDA was added thereto and then stirred for 1 hour, thus completely dissolving the 6FDA. The solid content was thus 20 wt %. The solution was then stirred at room temperature for 8 hours, thus obtaining a polyamic acid solution having a viscosity of 1300 cps at 23° C.

Thereafter, the same subsequent procedures as in Example 1 were conducted, giving a polyimide film having a thickness of 25 μm.

Example 16

As in Example 1, 2.9233 g (0.01 mol) of APB-133 was dissolved in 29.4632 g of DMAc, after which 4.4425 g (0.01 mol) of 6FDA was added thereto and then stirred for 1 hour, thus completely dissolving the 6FDA. The solid content was thus 20 wt %. The solution was then stirred at room temperature for 8 hours, thus obtaining a polyamic acid solution having a viscosity of 1200 cps at 23° C.

Thereafter, the same subsequent procedures as in Example 1 were conducted, giving a polyimide film having a thickness of 25 μm.

Example 17

As in Example 1, 2.0024 g (0.01 mol) of 3,3'-ODA was dissolved in 25.7796 g of DMAc, after which 4.4425 g (0.01 mol) of 6FDA was added thereto and then stirred for 1 hour, thus completely dissolving the 6FDA. The solid content was thus 20 wt %. The solution was then stirred at room temperature for 8 hours, thus obtaining a polyamic acid solution having a viscosity of 1600 cps at 23° C.

Thereafter, the same subsequent procedures as in Example 1 were conducted, giving a polyimide film having a thickness of 25 μm.

Comparative Example 1

As in Example 1, 5.1846 g (0.01 mol) of 4-BDAF was dissolved in 38.5084 g of DMAc, after which 4.4425 g (0.01 mol) of 6FDA was added thereto and stirred for 1 hour, thus completely dissolving the 6FDA. The solid content was thus 20 wt %. The solution was then stirred at room temperature for 8 hours, thus obtaining a polyamic acid solution having a viscosity of 1300 cps at 23° C.

Thereafter, the polyamic acid solution obtained after the completion of the reaction was spread to a thickness of 500~1000 μm on a glass substrate using a doctor blade, and was then dried in a vacuum oven at 40° C. for 1 hour and at 60° C. for 2 hours, thus obtaining a self-supporting film, which was then heated in a high-temperature oven at 80° C. for 3 hours, 100° C. for 1 hour, 200° C. for 1 hour, and 300° C. for 30 min at a heating rate of 5° C./min, thereby affording a polyimide film having a thickness of 25 μm.

Comparative Example 2

As in Example 1, 2.9233 g (0.01 mol) of APB-133 was dissolved in 29.4632 g of DMAc, after which 4.4425 g (0.01 mol) of 6FDA was added thereto and then stirred for 1 hour, thus completely dissolving the 6-FDA. The solid content was thus 20 wt %. The solution was then stirred at room temperature for 8 hours, thus obtaining a polyamic acid solution having a viscosity of 1200 cps at 23° C.

Thereafter, the same subsequent procedures as in Comparative Example 1 were conducted, giving polyimide films having a thickness of 25 μm, 50 μm, and 100 μm.

Comparative Example 3

As in Example 1, 2.0024 g (0.01 mol) of 3,3'-ODA was dissolved in 25.7796 g of DMAc, after which 4.4425 g (0.01 mol) of 6FDA was added thereto and then stirred for 1 hour, thus completely dissolving the 6FDA. The solid content was 20 wt %. The solution was then stirred at room temperature for 8 hours, thus obtaining a polyamic acid solution having a viscosity of 1600 cps at 23° C.

Thereafter, the same subsequent procedures as in Comparative Example 1 were conducted, giving polyimide films having a thickness of 25 μm, 50 μm, and 100 μm.

Comparative Example 4

As in Example 1, 2.0024 g (0.01 mol) of 4,4'-ODA was dissolved in 16.7344 g of DMAc, after which 2.1812 g (0.01 mol) of PMDA was added thereto and then stirred for 1 hour, thus completely dissolving the PMDA. The solid content was thus 20 wt %. The solution was then stirred at room temperature for 8 hours, thus obtaining a polyamic acid solution having a viscosity of 2500 poise at 23° C.

Thereafter, the same subsequent procedures as in Comparative Example 1 were conducted, giving polyimide films having a thickness of 25 μm, 50 μm, and 100 μm.

The properties of the polyimide films manufactured in the examples and comparative examples were measured as follows. The results are summarized in Tables 1 and 2 below.

(1) Refractive Index (RI) and Birefringence (BR)

The refractive index and birefringence of the polyimide film were measured under conditions of 23 26° C., humidity 40%, and 1 atm using a prism coupler (SPA-4000, available from SAIRON Technology).

(2) Transmittance and 50% Cut-Off Wavelength

The visible light transmittance and 50% cut-off wavelength of the polyimide film were measured using a UV spectrophotometer (Cary100, available from Varian).

(3) Color Coordinates

The color coordinates of the polyimide film were measured using a UV spectrophotometer (Cary100, available from Varian) according to ASTM E 1347-06. As such, a standard illuminant was CIE D65.

(4) Yellowness Index

The yellowness index of the polyimide film was measured using a UV spectrophotometer (Cary100, available from Varian) according to ASTM E313.

(5) Whiteness Index

The whiteness index of the polyimide film was measured using a UV spectrophotometer (Cary100, available from Varian) according to ASTM E313.

(6) Glass Transition Temperature ($T_g$)

The glass transition temperature of the polyimide film was measured using a differential scanning calorimeter (Q200, available from TA Instrument).

(7) Coefficient of Linear Thermal Expansion (CTE)

The coefficient of linear thermal expansion of the polyimide film was measured at 50~250° C. according to a TMA method using a TMA (Q400, available from TA Instrument).

TABLE 1

| | | Composition | Molar Ratio | Thick (μM) | Transmittance 380 nm~780 nm | 550 nm | 440 nm | Color Coordinates L | a | b |
|---|---|---|---|---|---|---|---|---|---|---|
| Ex. | 1 | 6FDA/6HMDA | 10:10 | 50 | 87.6 | 89.7 | 87.4 | 95.85 | −0.12 | 0.99 |
| | 2 | 6FDA/DBSDA | 10:10 | 50 | 86.06 | 89.0 | 82.43 | 95.63 | 0.0879 | 2.20 |
| | 3 | 6FDA/2,2'-TFDB | 10:10 | 50 | 90.3 | 91.1 | 89.6 | 96.14 | −0.23 | 1.12 |
| | 4 | 6FDA/2,2'-TFDB + 4DDS | 10:7:3 | 50 | 87.16 | 90.01 | 84.23 | 96.15 | 0.051 | 1.53 |
| | 5 | 6HBDA/2,2'-TFDB | 10:10 | 50 | 85.6 | 89.03 | 83.84 | 95.5978 | −0.3354 | 1.4917 |
| | 6 | 6HBDA + BPDA/2,2'-TFDB | 8:2:10 | 50 | 85.9 | 91.18 | 79.93 | 96.0719 | −0.1731 | 0.9608 |
| | 7 | 6HBDA + ODPA/2,2'-TFDB | 7:3:10 | 50 | 85.91 | 89.41 | 85.90 | 95.77 | 0.0934 | 1.1823 |
| | 8 | 6FDA/6HMDA | 10:10 | 50 | 87.6 | 88.7 | 85.4 | 95.7 | 0.12 | 3.27 |
| | 9 | 6FDA/DBSDA | 10:10 | 50 | 86.06 | 88.3 | 84.43 | 95.59 | 0.1168 | 2.31 |
| | 10 | 6FDA/2,2'-TFDB | 10:10 | 50 | 90.3 | 90.1 | 86.6 | 96.09 | −0.43 | 1.77 |
| | 11 | 6FDA/2,2'-TFDB + 4DDS | 10:7:3 | 50 | 87.16 | 88.71 | 83.73 | 96.03 | 0.094 | 1.58 |
| | 12 | 6HBDA/2,2'-TFDB | 10:10 | 50 | 85.6 | 88.33 | 82.86 | 95.64 | 0.109 | 1.77 |
| | 13 | 6HBDA + BPDA/2,2'-TFDB | 8:2:10 | 50 | 85.9 | 90.18 | 78.63 | 96.04 | −1.912 | 4.16 |
| | 14 | 6HBDA + ODPA/2,2'-TFDB | 7:3:10 | 50 | 85.91 | 89.01 | 83.90 | 95.47 | −0.2953 | 1.4496 |
| Ex. | 1 | 6FDA/6HMDA | 10:10 | 100 | 87.0 | 89.2 | 85.2 | 95.69 | −0.2756 | 1.352 |
| | 2 | 6FDA/DBSDA | 10:10 | 100 | 85.35 | 88.6 | 78.64 | 95.64 | 0.088 | 2.20 |
| | 3 | 6FDA/2,2'-TFDB | 10:10 | 100 | 89.4 | 90.5 | 84.7 | 96.10 | −0.51 | 1.97 |
| | 4 | 6FDA/2,2'-TFDB + 4DDS | 10:7:3 | 100 | 86.47 | 91.05 | 83.07 | 95.92 | 0.14 | 1.534 |
| | 5 | 6HBDA/2,2'-TFDB | 10:10 | 100 | 86.76 | 89.15 | 87.37 | 95.3798 | −0.1324 | 2.0907 |
| | 6 | 6HBDA + BPDA/2,2'-TFDB | 8:2:10 | 100 | 85.21 | 89.67 | 75.13 | 95.91 | 0.106 | 1.4817 |
| | 7 | 6HBDA + ODPA/2,2'-TFDB | 7:3:10 | 100 | 85.48 | 88.97 | 85.26 | 95.34 | 0.0984 | 1.2623 |
| | 8 | 6FDA/6HMDA | 10:10 | 100 | 85.22 | 88.8 | 83.54 | 95.54 | −0.2518 | 4.7 |
| | 9 | 6FDA/DBSDA | 10:10 | 100 | 85.11 | 88.22 | 73.84 | 95.49 | 0.1819 | 3.82 |
| | 10 | 6FDA/2,2'-TFDB | 10:10 | 100 | 86.75 | 88.65 | 81.47 | 95.76 | −0.94 | 3.78 |
| | 11 | 6FDA/2,2'-TFDB + 4DDS | 10:7:3 | 100 | 85.36 | 88.38 | 79.07 | 95.99 | 0.0372 | 1.81 |
| | 12 | 6HBDA/2,2'-TFDB | 10:10 | 100 | 85.89 | 88.12 | 82.87 | 95.69 | 0.2285 | 0.853 |
| | 13 | 6HBDA + BPDA/2,2'-TFDB | 8:2:10 | 100 | 85.07 | 88.34 | 73.33 | 95.45 | 0.125 | 1.9624 |
| | 14 | 6HBDA + ODPA/2,2'-TFDB | 7:3:10 | 100 | 85.19 | 88.11 | 82.26 | 95.53 | −0.524 | 1.809 |
| Ex. | 15 | 6FDA/4-BDAF | 10:10 | 25 | 85.4 | 88.2 | 71.5 | 95.29 | 0.1819 | 4.12 |
| | 16 | 6FDA/APB-133 | 10:10 | 25 | 86.8 | 88.7 | 79.3 | 95.47 | 0.0372 | 1.91 |
| | 17 | 6FDA/3,3'-ODA | 10:10 | 25 | 87.5 | 90.4 | 80.13 | 95.69 | 0.2285 | 0.954 |
| C. Ex. | 1 | 6FDA/4-BDAF | 10:10 | 25 | 82.8 | 87.2 | 63.1 | 93.6 | 0.56 | 12.6 |
| | 2 | 6FDA/APB-133 | 10:10 | 25 | 84.4 | 87.8 | 77.3 | 95.27 | 0.514 | 3.47 |
| | 3 | 6FDA/3,3'-ODA | 10:10 | 25 | 84.9 | 90.0 | 77.1 | 95.64 | 0.10 | 3.12 |
| | 4 | PMDA/4,4'-ODA | 10:10 | 25 | 56.6 | 73.0 | 0.05 | 88.63 | 6.94 | 90.08 |
| C. Ex. | 2 | 6FDA/APB-133 | 10:10 | 50 | 83.8 | 87.2 | 71.2 | 94.6 | 0.586 | 5.09 |
| | 3 | 6FDA/3,3'-ODA | 10:10 | 50 | 84.3 | 89.2 | 71.4 | 94.6 | 0.124 | 5.03 |
| | 4 | PMDA/4,4'-ODA | 10:10 | 50 | 56.0 | 69.2 | — | 78.5 | 7.05 | — |
| C. Ex. | 2 | 6FDA/APB-133 | 10:10 | 100 | 83.1 | 86.7 | 66.5 | 91.8 | 0.728 | 8.2 |
| | 3 | 6FDA/3,3'-ODA | 10:10 | 100 | 83.5 | 88.8 | 65.8 | 91.6 | 0.138 | 8.34 |
| | 4 | PMDA/4,4'-ODA | 10:10 | 100 | — | — | — | — | — | — |

TABLE 2

| | | Composition | Molar Ratio | Thick (μM) | RI | BR | Yellow Index | White Index | 50% Cut-Off (nm) | Tg (° C.) | CTE (ppm/° C.) |
|---|---|---|---|---|---|---|---|---|---|---|---|
| Ex | 1 | 6FDA/6HMDA | 10:10 | 50 | 1.5762 | 0.0072 | 1.35 | 85.11 | 384 | 252 | 46 |
| | 2 | 6FDA/DBSDA | 10:10 | 50 | 1.5756 | 0.0068 | 2.89 | 81.35 | 390 | 228 | 46 |
| | 3 | 6FDA/2,2'-TFDB | 10:10 | 50 | 1.5435 | 0.002 | 1.13 | 85.89 | <380 | 315 | 48 |
| | 4 | 6FDA/2,2'-TFDB + 4DDS | 10:7:3 | 50 | 1.5586 | 0.0068 | 2.64 | 82.27 | 389 | 240 | 43 |
| | 5 | 6HBDA/2,2'-TFDB | 10:10 | 50 | 1.5484 | 0.0034 | 2.56 | 82.37 | 392 | 249 | 43 |
| | 6 | 6HBDA + BPDA/2,2'-TFDB | 8:2:10 | 50 | 1.5435 | 0.0035 | 2.46 | 84.08 | 392 | 272 | 33 |
| | 7 | 6HBDA + ODPA/2,2'-TFDB | 7:3:10 | 50 | 1.5870 | 0.0047 | 2.21 | 82.87 | 394 | 269 | 31.7 |
| | 8 | 6FDA/6HMDA | 10:10 | 50 | 1.562 | 0.0262 | 1.59 | 84.53 | 384 | 252 | 46 |
| | 9 | 6FDA/DBSDA | 10:10 | 50 | 1.5756 | 0.0182 | 3.72 | 76.55 | 390 | 228 | 46 |
| | 10 | 6FDA/2,2'-TFDB | 10:10 | 50 | 1.5435 | 0.012 | 1.22 | 85.46 | <380 | 315 | 48 |
| | 11 | 6FDA/2,2'-TFDB + 4DDS | 10:7:3 | 50 | 1.5586 | 0.0158 | 3.01 | 80.88 | 389 | 240 | 43 |
| | 12 | 6HBDA/2,2'-TFDB | 10:10 | 50 | 1.5484 | 0.0113 | 2.95 | 81.31 | 392 | 249 | 43 |
| | 13 | 6HBDA + BPDA/2,2'-TFDB | 8:2:10 | 50 | 1.5435 | 0.0287 | 2.81 | 81.76 | 395 | 272 | 35 |
| | 14 | 6HBDA + ODPA/2,2'-TFDB | 7:3:10 | 50 | 1.5870 | 0.0235 | 2.66 | 82.06 | 397 | 269 | 34.2 |

TABLE 2-continued

|  |  | Composition | Molar Ratio | Thick (μM) | RI | BR | Yellow Index | White Index | 50% Cut-Off (nm) | Tg (° C.) | CTE (ppm/° C.) |
|---|---|---|---|---|---|---|---|---|---|---|---|
| Ex. | 1 | 6FDA/6HMDA | 10:10 | 100 | 1.5762 | 0.0072 | 2.06 | 83.06 | 387 | 252 | 43 |
|  | 2 | 6FDA/DBSDA | 10:10 | 100 | 1.5756 | 0.0068 | 3.24 | 80.21 | 393 | 228 | 44 |
|  | 3 | 6FDA/2,2'-TFDB | 10:10 | 100 | 1.5435 | 0.002 | 1.72 | 84.78 | <380 | 315 | 46 |
|  | 4 | 6FDA/2,2'-TFDB + 4DDS | 10:7:3 | 100 | 1.5586 | 0.0068 | 2.88 | 81.35 | 392 | 240 | 41 |
|  | 5 | 6HBDA/2,2'-TFDB | 10:10 | 100 | 1.5484 | 0.0034 | 2.26 | 82.29 | 396 | 249 | 40 |
|  | 6 | 6HBDA + BPDA/2,2'-TFDB | 8:2:10 | 100 | 1.5435 | 0.0035 | 3.97 | 75.46 | 394 | 272 | 31 |
|  | 7 | 6HBDA + ODPA/2,2'-TFDB | 7:3:10 | 100 | 1.5870 | 0.0047 | 2.86 | 81.41 | 395 | 269 | 30.85 |
|  | 8 | 6FDA/6HMDA | 10:10 | 100 | 1.562 | 0.0262 | 2.49 | 83.88 | 387 | 252 | 43 |
|  | 9 | 6FDA/DBSDA | 10:10 | 100 | 1.5756 | 0.0182 | 4.61 | 71.48 | 393 | 228 | 44 |
|  | 10 | 6FDA/2,2'-TFDB | 10:10 | 100 | 1.5435 | 0.012 | 2.11 | 82.77 | <380 | 315 | 46 |
|  | 11 | 6FDA/2,2'-TFDB + 4DDS | 10:7:3 | 100 | 1.5586 | 0.0158 | 3.67 | 77.33 | 392 | 240 | 41 |
|  | 12 | 6HBDA/2,2'-TFDB | 10:10 | 100 | 1.5484 | 0.0113 | 3.56 | 78.18 | 396 | 249 | 40 |
|  | 13 | 6HBDA + BPDA/2,2'-TFDB | 8:2:10 | 100 | 1.5435 | 0.0287 | 4.78 | 71.26 | 397 | 272 | 34.5 |
|  | 14 | 6HBDA + ODPA/2,2'-TFDB | 7:3:10 | 100 | 1.5870 | 0.0235 | 3.34 | 79.64 | 399 | 269 | 33.85 |
|  | 15 | 6FDA/4-BDAF | 10:10 | 25 | 1.5745 | 0.076 | 4.9 | 68.16 | 398 | — | 47.1 |
|  | 16 | 6FDA/APB-133 | 10:10 | 25 | 1.582 | 0.048 | 3.5 | 77.52 | 390 | — | 44.2 |
|  | 17 | 6FDA/3,3'-ODA | 10:10 | 25 | 1.588 | 0.087 | 3.25 | 78.24 | 390 | — | 38.9 |
| C. | 1 | 6FDA/4-BDAF | 10:10 | 25 | 1.61 | 0.08 | 9.7 | 52.36 | 411 | 263 | 52.3 |
| Ex. | 2 | 6FDA/APB-133 | 10:10 | 25 | 1.61 | 0.06 | 5.5 | 66.45 | 395 | 206 | 47.1 |
|  | 3 | 6FDA/3,3'-ODA | 10:10 | 25 | 1.61 | 0.013 | 5.29 | 68.66 | 396 | 244 | 41 |
|  | 4 | PMDA/4,4'-ODA | 10:10 | 25 | 1.78 | 0.13 | 91.7 | 3.22 | 514 | No | 26 |
| C. | 2 | 6FDA/APB-133 | 10:10 | 50 | 1.61 | 0.06 | 6.9 | 61.23 | 398 | — | 46.0 |
| Ex. | 3 | 6FDA/3,3'-ODA | 10:10 | 50 | 1.61 | 0.013 | 6.46 | 64.01 | 399 | — | 39.6 |
|  | 4 | PMDA/4,4'-ODA | 10:10 | 50 | 1.78 | 0.13 | — | — | — | — | 25.0 |
| C. | 2 | 6FDA/APB-133 | 10:10 | 100 | 1.61 | 0.06 | 14.2 | 33.14 | 401 | — | 44.5 |
| Ex. | 3 | 6FDA/3,3'-ODA | 10:10 | 100 | 1.61 | 0.013 | 14.26 | 32.66 | 405 | — | 39.1 |
|  | 4 | PMDA/4,4'-ODA | 10:10 | 100 | 1.78 | 0.13 | — | — | — | — | — |

In addition, the polyimide film of each of Example 11 (film thickness: 50 μm) and Comparative Example 1 was mounted on a 20" backlight unit, thus manufacturing a display panel. The following properties thereof were measured under conditions of about 25° C. and humidity of 30~80%. The results are shown in Table 3 below.

(1) Luminance

The luminance was measured using CA-100Plus (available from Minolta).

(2) Full White Luminance

The luminance was measured using CA-100Plus (available from Minolta). Under a condition of full white screen, the difference between brightness in the center of the screen and brightness in the peripheral portions thereof was evaluated.

(3) Brightness Uniformity

The manufactured film was mounted on a 20" backlight unit, after which the luminance thereof was measured under conditions of about 25° C. and humidity of 30~80% using CA-100Plus (available from Minolta). The brightness uniformity across the whole screen was evaluated.

(4) White Uniformity

Under a condition of full white screen, the degree of uniform distribution of white color across the whole screen was evaluated using Muracam-400 (available from Eldim). The chromaticity of the whole screen was measured, and the difference between the color coordinates in the center of the screen and the color coordinates in the peripheral portions thereof was represented by Δ. (As Δ is lower, white uniformity is evaluated to be excellent).

(5) Contrast Ratio

The difference in brightness between the darkest color and the brightest color in a dark room was measured using PR-705 (available from Photo Research).

(6) Color Reproducibility

The coordinate values corresponding to red, green and blue colors were measured on the CIE color coordinate system, after which the area of a triangle defined by these respective coordinate values as the apexes thereof was calculated, thus determining a reproducible color gamut. Also, the color gamut thus obtained was converted into a percentage compared to the standard of NTSC (National Television System Committee), thus determining a color reproduction rate (%).

TABLE 3

|  |  | Example 11 (Film Thickness: 50 μm) | Comparative Example 1 |
|---|---|---|---|
| Luminance (cd/m$^2$) |  | 1000 | 800 |
| Full White Luminance (%) |  | 82.9 | 68.2 |
| Brightness Uniformity (%) |  | 95.1 | 93.3 |
| White | Δx | 0.004 | 0.007 |
| Uniformity | Δy | 0.004 | 0.006 |
| Contrast Ratio |  | 2000:1 | 1000:1 |
| Color | Red (x, y) | 0.653, 0.329 | 0.648, 0.346 |
| Reproducibility | Green (x, y) | 0.226, 0.715 | 0.239, 0.668 |
|  | Blue (x, y) | 0.156, 0.071 | 0.158, 0.073 |
|  | Color Gamut | 0.15100 | 0.13472 |
|  | Color Reproduction Rate (%) | 95.6 | 85.3 |

* Color Reproduction Rate (%): Relative percentage to (S = 0.158, NTSC standard)

As is apparent from the results of evaluation of the properties, in the case where the polyimide film of the present invention was mounted to a display, luminance, full white luminance, brightness uniformity, and white uniformity were seen to be excellent. Further, the contrast ratio was high and the color reproducibility was also superior.

Therefore, when the polyimide film having a refractive index and a birefringence disclosed in the present invention is used, the image on the screen becomes bright and clear.

The invention claimed is:

1. A polyimide film, which is obtained by a process comprising: polymerizing a diamine and a dianhydride in presence of a first solvent to give a polyamic acid solution; imidizing the polyamic acid solution; adding the imidized solution to a second solvent; performing filtration and drying to give a solid polyimide resin; and dissolving the solid polyimide resin in the first solvent to prepare a polyimide solution, which is then subjected to a film forming process to obtain the polyimide film, wherein the polyimide film has a refractive index of 1.60 or less and a birefringence of 0.10 or less when measured using a prism coupler; an average transmittance of 85% or more at 380-780 nm when measured using a UV spectrophotometer for a film thickness of 25-100 μm; a yellowness index of 5.0 or less and a whiteness index of 60 or more for the film thickness of 25-100 μm; and color coordinates in which L is 90 or more, a is 5 or less and b is 5 or less, when measured using a UV spectrophotometer for the film thickness of 25-100 μm.

2. The polyimide film according to claim 1, which has a transmittance of 88% or more at 550 nm and a transmittance of 70% or more at 440 nm, when measured using a UV spectrophotometer for the film thickness of 25-100 μm.

3. The polyimide film according to claim 1, which has a 50% cut-off wavelength of 400 nm or less when measured using a UV spectrophotometer.

4. The polyimide film according to claim 1 wherein the second solvent has a polarity lower than that of the first solvent.

5. The polyimide film according to claim 1, wherein the first solvent comprises one or more selected from the group consisting of m-cresol, N-methyl-2-pyrrolidone, dimethylformamide, dimethylacetamide, dimethylsulfoxide, acetone, diethylacetate, a low boiling point solvent, and a low absorbing solvent, and the second solvent comprises one or more selected from among water, alcohols, ethers, and ketones.

6. The polyimide film according to claim 1, wherein the dianhydride is an aromatic dianhydride which comprises one or more selected from the group consisting of 2,2-bis(3,4-dicarboxyphenyl)hexafluoropropane dianhydride, 4-(2,5-dioxotetrahydrofuran-3-yl)-1,2,3,4-tetrahydronaphthalene-1,2-dicarboxylic anhydride, 4,4'-(4,4'-isopropylidenediphenoxyl)bis(phthalic anhydride), 3,3'-(4,4'-oxydiphthalic dianhydride), and 3,4,3',4'-biphenyltetracarboxylic dianhydride.

7. The polyimide film according to claim 1, wherein the diamine is an aromatic diamine which comprises one or more selected from the group consisting of 2,2-bis[4-(4-aminophenoxy)-phenyl]propane, 2,2'-bis(trifluoromethyl)-4,4'-diaminobiphenyl, 3,3'-bis(trifluoromethyl)-4,4'-diaminobiphenyl, 4,4'-bis(3-aminophenoxy)diphenylsulfone, bis(3-aminophenyl)sulfone, bis(4-aminophenyl)sulfone, 1,3-bis(3-aminophenoxy)benzene, 1,4-bis(4-aminophenoxy)benzene, 2,2'-bis[3 (3-aminophenoxy)phenyl]hexafluoropropane, 2,2'-bis[4(4-aminophenoxy)phenyl]hexafluoropropane, and oxydianiline.

8. An anti-reflective film, comprising the polyimide film of claim 1.

9. A substrate for a display, comprising the polyimide film of claim 1.

10. A protective film, comprising the polyimide film of claim 3.

* * * * *